United States Patent
Baumann

[11] Patent Number: 5,882,766
[45] Date of Patent: Mar. 16, 1999

[54] SEALING STRIPS

[75] Inventor: Michael Baumann, Nettetal, Germany

[73] Assignee: Draftex Industries Limited, Edinburgh, Scotland

[21] Appl. No.: 809,257

[22] PCT Filed: Aug. 16, 1995

[86] PCT No.: PCT/GB95/01942

§ 371 Date: Mar. 13, 1997

§ 102(e) Date: Mar. 13, 1997

[87] PCT Pub. No.: WO96/08387

PCT Pub. Date: Mar. 21, 1996

[30]   Foreign Application Priority Data

Sep. 13, 1994 [GB]  United Kingdom ................... 9418427
Apr. 7, 1995  [GB]  United Kingdom ................... 9507296

[51] Int. Cl.⁶ .................................................. E06B 7/16
[52] U.S. Cl. .......................................... 428/122; 428/358
[58] Field of Search ..................................... 428/122, 358

[56]         References Cited

U.S. PATENT DOCUMENTS

| | | | |
|---|---|---|---|
| 3,371,447 | 3/1968 | Ruff et al. | 428/31 X |
| 4,581,851 | 4/1986 | Warner | 428/122 X |
| 4,608,779 | 9/1986 | Maeda et al. | 428/122 X |
| 5,038,521 | 8/1991 | Andrzejewski et al. | 428/122 X |
| 5,194,312 | 3/1993 | Verig | 428/122 |

*Primary Examiner*—Henry F. Epstein
*Attorney, Agent, or Firm*—Leydig, Voit & Mayer, Ltd.

[57]         ABSTRACT

A sealing arrangement for attachment to the window frame running around a window opening on a vehicle door comprises a sealing strip made of extruded plastics or rubber material and incorporating metal reinforcemet. The strip fits over a flange forming part of the window frame. The strip has a locking protrusion made of flexible material having a shoulder adjacent a hollow interior chamber. The latter enables the shoulder to flex and pivot and to pass over a re-entrant rigid lip at the mouth of a rigid channel in the frame and to lock behind this lip. The strip can thus be fitted and removed without the use of a tool. The strip also defines a channel for receiving the window glass.

13 Claims, 3 Drawing Sheets

SEALING STRIPS

The invention relates to a sealing arrangement for sealing an edge of an opening, comprising a rigid frame for positioning along the edge and a sealing strip made of flexible material for attachment to the frame, the frame comprising a flange extending transversely to the plane of the opening for receiving the sealing strip, the sealing strip defining a channel for embracingly gripping the flange, the flange being located at one edge of an aperture and extending away from the plane of the aperture, the opposite edge of the aperture defining a rigid formation, and the sealing strip defining an integral locking portion arranged to enter the aperture as the flange enters the channel of the strip, the locking portion terminating in a shoulder presenting a distal face extending longitudinally of the strip and facing away therefrom in a direction so as to be inclined both to the depth of the channel of the strip and to the plane of the aperture and thereby to obliquely engage the rigid formation as the flange enters the channel, whereby the shoulder flexes and passes through the aperture, the material of the locking portion thereafter resiling on the opposite side of the rigid formation to hold the sealing strip in position.

Such an arrangement is shown in U.S. Pat. No. 5038521 (Andrzejewski et al), corresponding to French Patent Specification No. 2648887. In this known arrangement, however, the locking portion comprises a relatively thick and stiff member of lesser cross-sectional size than the aperture and which, during the fitting process, passes through the aperture. On one of its longitudinally extending faces, an integral lip extends substantially perpendicularly to engage one edge of the aperture, and the opposite longitudinally extending face defines a groove for engaging the rigid formation along the opposite edge of the aperture. The lip therefore has to flex in order to enable the locking portion to enter the aperture so that the groove can engage the rigid formation. If the lip is sufficiently flexible or hingeable to enable easy fitting, the sealing strip may not be adequately secured in position. If the lip is less flexible or hingeable, fitting will be more difficult and so also will be disassembly (e.g. for recycling purposes). The invention aims to deal with these problems.

Accordingly, the known sealing arrangement is characterised in that the locking portion also defines a hollow chamber running longitudinally of the strip and positioned immediately behind the said shoulder to enable the shoulder to pivot by partial collapse of the flexible material into the hollow chamber as the shoulder passes through the aperture.

Embodiments of the invention to be described in more detail below, by way of example only, are in the form of sealing arrangements for use in vehicle body construction and, in particular, for sealing the movable panes of window glass in vehicle windows.

BRIEF DESCRIPTION OF THE DRAWINGS

Sealing strips and sealing arrangements embodying the invention and for fitting around the window openings of vehicle doors will now be described, by way of example only, with reference to the accompanying diagrammatic drawings in which.

Figure 1:
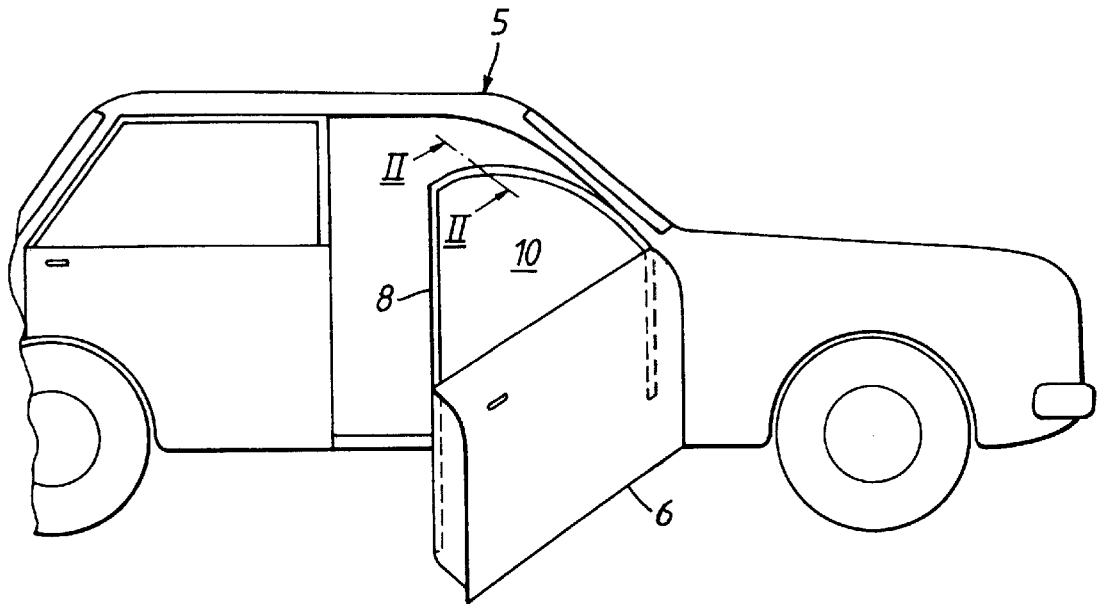
FIG. 1 is a pictorial view of part of a vehicle showing a door to which the sealing strip may be fitted.

The vehicle 5 (FIG. 1) has a door with a window frame 8 defining a window opening 10. A pane of window glass is slidable in a vertical direction in the frame 8 so as to be lowerable into and raisable from the lower hollow part of the door 6.

The window frame 8 (FIG. 2) is in the form of a metal section 12 defining a channel 14 facing outwardly of the vehicle. A second metal section 16 is fitted into the channel 14 and welded to the metal section 12 to form flanges at 18 and 20. The metal section 16 defines a smaller channel 22 having a rigid re-entrant formation 23 extending partially across its mouth.

Figure 2:
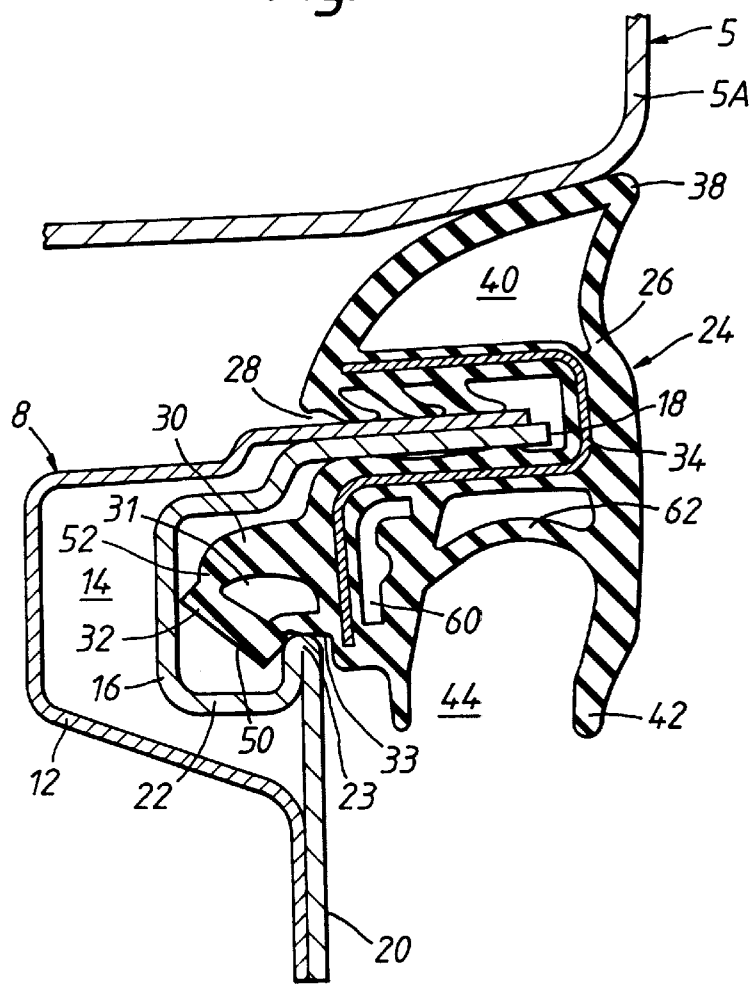
FIG. 2 is a cross-section on the line II—II of FIG. 1, showing one of the sealing strips in position.

The sealing strip along the top of the window frame is shown at 24 in FIG. 2. The strip 24 is made of extruded rubber or plastics material 26. This defines a channel 28 which is sized to fit closely on the flange 18, and a locking protrusion 30 which fits within the channel 22. The protrusion 30 is provided with a hollow internal chamber 31 and an end shoulder 32 of rectangular external shape. As shown in FIG. 2, the protrusion is held in the channel 22 by engagement of the rigid formation in a groove 33 formed behind the shoulder 32. In this way, the strip 24 is secured on the frame 8 and this is assisted by a metal reinforcement 34 which is embedded in the extruded material. The reinforcement 34 embraces the channel 28. The reinforcement 34 may be of any suitable form. It may be made of unapertured metal strip. Instead, however, it may incorporate slits or slots to increase its flexibility and could be in the form of completely separate side-by-side metal elements. In another form, it could be made of looped wire. Advantageously, however, the base of its channel is unapertured and the remainder is provided with parallel slits.

The extruded plastics or rubber material also extends to define a shoulder 38 which, when the door is closed, seals against the part 5A of the vehicle body 5 running along the top of the door opening. The shoulder 38 is adjacent to a hollow interior chamber 40 in the extruded material which increases the flexibility of the shoulder 38.

On the outside of the vehicle body, the extruded material extends to form a lip 42 which is one wall of a channel 44 for receiving the window glass 46.

The channel 44 incorporates a web 62 which is positioned to be contacted by the approaching window glass 46, the latter's pressure on the web 62 then pulling the lip 42 into contact with the window glass as shown in FIG. 2.

Figure 3:
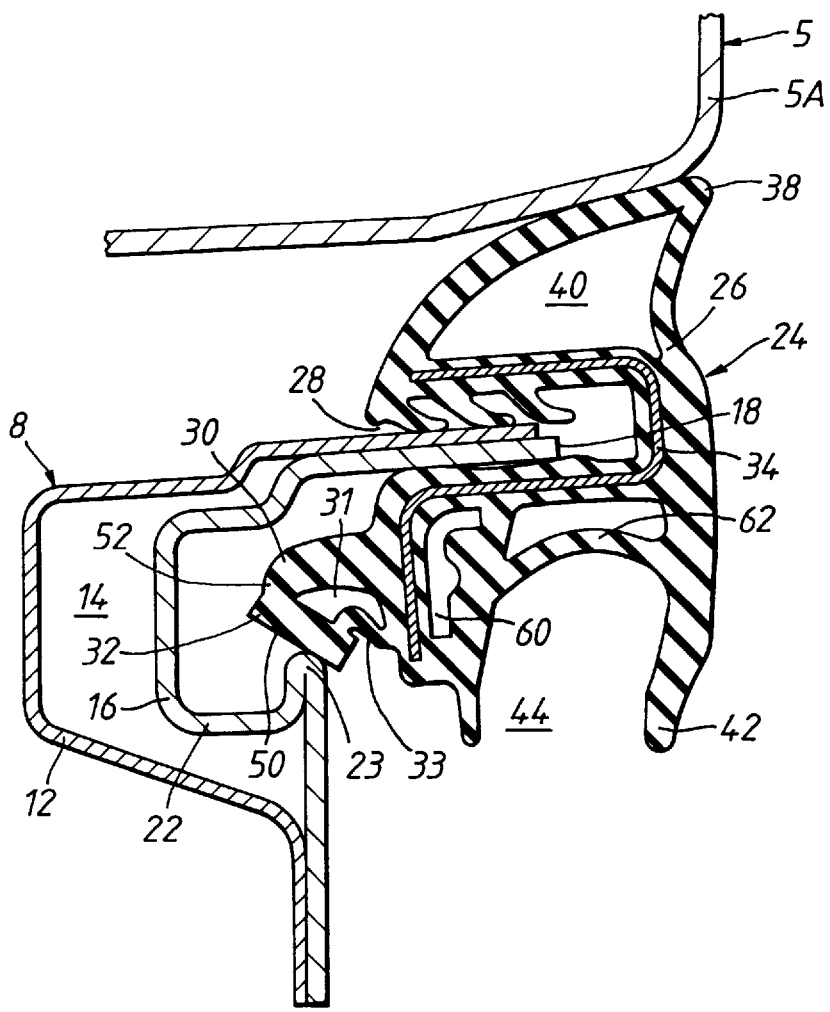
FIG. 3 shows the sealing strip of FIG. 2 in the course of being fitted into position.

FIG. 3 shows how the sealing strip 24 is mounted in position. As shown, the sealing strip 24 is positioned so that the channel 28 embraces the flange 18 and is then pushed onto the flange. As indicated in FIG. 3, the face 50 of the shoulder 32 of the locking protrusion 30 engages the rigid formation 23. As the strip 24 continues to be moved to the left, as viewed in FIG. 3, the shoulder 32 is caused to pivot about a pivot point indicated at 52. This pivotting action is assisted by the presence of the hollow chamber 31 into which the base of the groove 33 partially collapses. The pivotting of the shoulder 32 enables the shoulder to enter the channel 22 whereafter the material of the base of the groove 33 resiles so that the shoulder 32 then assumes the position shown in FIG. 2 and the rigid lip 23 lockingly engages the groove 33.

If it is required to remove the sealing strip 24 from the window frame 8 for any reason (for example, during repair of the vehicle body after damage or for recycling purposes at the end of the vehicle's life), this can easily be done. As the strip is pulled from the flange 18, the shoulder 32 moves slightly upwards (as viewed in FIG. 3) so that it clears the rigid lip formation, enabling the strip to be easily withdrawn from the window frame. The configuration of the locking protrusion 30 is therefore such that the sealing strip 24 is firmly held in position but can nevertheless be fitted simply and quickly without the use of a tool. Furthermore, it can also be removed manually when necessary.

The plastics or rubber material of the strip 24 may be extruded so that it is not of constant hardness/softness throughout. For example, the shoulder 38 and the lips 42 and 54 may be extruded so as to be softer than the remainder of the material. It may also be advantageous for the shoulder 32 to be harder than the material of the remainder of the locking protrusion 30 or at least the base of the groove 33.

The surfaces of the lip 42, and of the web 62 engaging the window pane 46 may be flocked or otherwise treated to provide relatively low friction.

Along the side of the window frame, a modified construction may be used in which a thin metal strip, possibly slitted, may be incorporated in the lip 42 for reinforcing purposes.

Figure 4:
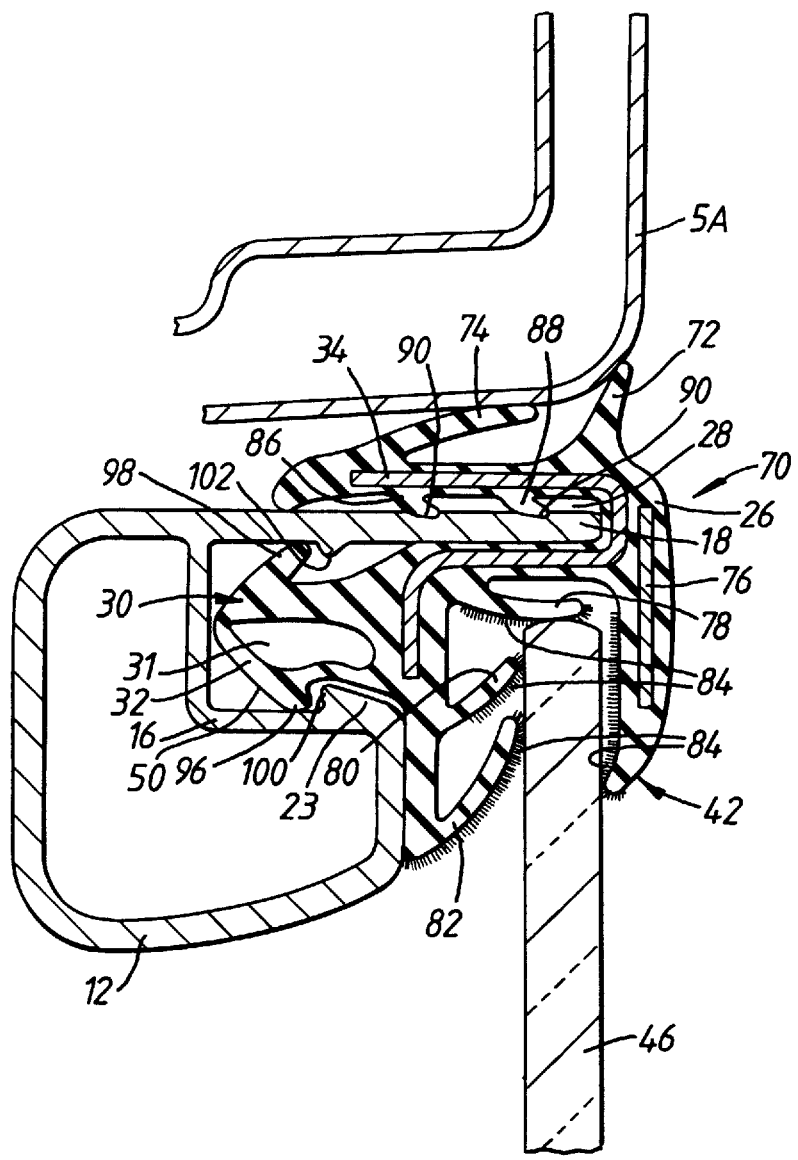
FIG. 4 is a cross-section corresponding to FIG. 3 but showing another of the sealing strips.

The sealing strip 70 shown in FIG. 4 has similarities with the sealing strip 24 and items in FIG. 4 corresponding to those in the other Figures are similarly referenced.

The strip 70 is made of extruded rubber or plastics material 26 and defines the channel 28 which is sized to fit closely on the flange 18. In the case of the strip 70, the material 26 defining the channel 28 is reinforced with metal reinforcement 34. The material 26 is extended to define lips 72 and 74 which, when the door is closed, seal against the part 5A of the vehicle body 5. On the outside of the vehicle body, the extruded material extends to form a lip 42 which forms one wall of the channel 44 for receiving the window glass 46. In the case of the strip 70, the lip 42 is reinforced with an embedded metal reinforcement 76. This may be omitted if desired (and, of course, the channel wall 42 of the strip of FIG. 2 may incorporate a metal reinforcement corresponding to the reinforcement 76 if desired).

The channel 44 differs from the channel 44 of the strip 24 in that it does not incorporate the web 62. Instead, it is provided with lips 78,80 and 82 which make sealing contact with the window glass 46. These lips are provided with flock coverings 84.

One internal wall of the channel 28 is provided with integral lips 86,88 which bear against one face of the flange 18 and engage in serrations 90, to improve the grip between the sealing strip 70 and the window frame. The opposite wall of the channel 28 is provided with integral protruberances 92,94.

The strip 70 differs from the strip 24 of FIG. 2 in that the strip 70 has a differently shaped locking protrusion 30. The locking protrusion 30 of the strip 70 is provided with first and second longitudinally extending lips 96 and 98. The metal section 16 in FIG. 4 has a shape which is different from section 16 of FIGS. 2 and 3. It is formed with re-entrant formations 100 and 102. When the strip 70 is fitted into position, by sliding the channel 28 over the flange 18, the head 30 of the strip 70 enters the mouth between the re-entrant formations 100 and 102. During this process, the head 30 partially collapses, this process being aided by the hollow internal chamber 31. This partial collapse of the head 30 enables the lips 96 and 98 to pass through the mouth between the re-entrant formations 100,102, whereafter the head resiles into the form shown in FIG. 4, so that the lips 96 and 98 lock behind the formations 100 and 102.

The sealing strip 70 of FIG. 4 differs from the sealing strip 24 of FIGS. 2 and 3 in that the sealing strip 24 can be more easily removed from the window frame, as explained above. The strip 70 is less easily removed and is therefore more suitable for applications where very firm fixing of the sealing strip in the window frame is of greater importance than easy removal.

I claim:

1. In a sealing arrangement for sealing an edge of an opening, comprising a rigid frame for positioning along the edge and a sealing strip made of flexible material for attachment to the frame, the frame comprising a flange extending transversely to the plane of the opening for receiving the sealing strip, the frame defining an aperture having the flange at one edge and having a rigid formation at an opposite edge, the sealing strip defining a channel for embracingly gripping the flange, and the sealing strip defining an integral locking portion arranged to enter the aperture as the flange enters the channel of the strip, the locking portion terminating in a shoulder presenting a distal face extending longitudinally of the strip and facing away therefrom in a direction so as to be inclined both to the depth of the channel of the strip and to the plane of the aperture and thereby to obliquely engage the rigid formation as the flange enters the channel, whereby the shoulder flexes and passes through the aperture, the material of the locking portion thereafter resiling on the opposite side of the rigid formation to hold the sealing strip in position, the improvement comprising a hollow chamber defined in the locking portion and running longitudinally of the strip and positioned immediately behind the said shoulder to enable the shoulder to pivot by partial collapse of the flexible material into the hollow chamber as the shoulder passes through the aperture.

2. An arrangement according to claim 1, in which the locking portion defines a groove running longitudinally of the strip and positioned to engage the rigid formation when the material of the locking portion has resiled after the shoulder (32) has entered the aperture.

3. An arrangement according to claim 2, in which the base of the groove is formed by a wall of the hollow chamber.

4. An arrangement according to claim 3, in which the hollow charmber has a further wall, opposite to the said wall, which integrally joins the shoulder and forms a pivot point on which the shoulder pivots as it passes through the aperture.

5. An arrangement according to claim 1, in which the shoulder has a rectangular external configuration.

6. An arrangement according to claim 1, in which the material of the shoulder is harder than at least some of the remainder of the flexible material.

7. An arrangement according to claim 1, in which the said shoulder is extended beyond the locking portion to define a lip which, upon resiling of the material of the locking portion, engages the said opposite side of the rigid formation to hold the sealing strip in position.

8. An arrangement according to claim 7, in which the locking portion incorporates a second lip which, after the said shoulder has passed through the aperture, engages a further rigid formation defining the said one edge of the aperture.

9. An arrangement according to claim 8, in which the termination of the locking portion comprises the distal face of the said shoulder and the distal face of a second shoulder, the distal face of the second shoulder extending from the distal face of the first-mentioned shoulder to the second lip, the two distal faces being inclined in opposite directions and meeting at a ridge extending longitudinally of the strip.

10. An arrangement according to claim 1, in which the aperture is the mouth of a channel formed by rigid material, this channel having a base and two side walls, one of the side walls being extended without substantial change of direction to form the said flange and the other side wall having a re-entrant portion defining the rigid formation.

11. An arrangement according to claim 1, in which the flexible material defines a further channel extending substantially perpendicularly to the first-mentioned channel and for sealingly receiving a closure member for the opening.

12. An arrangement according to claim 11, in which the closure member is a movable window glass.

13. An arrangement according to claim 1, including embedded reinforcement within the flexible material.

\* \* \* \* \*